United States Patent Office 3,018,798
Patented Jan. 30, 1962

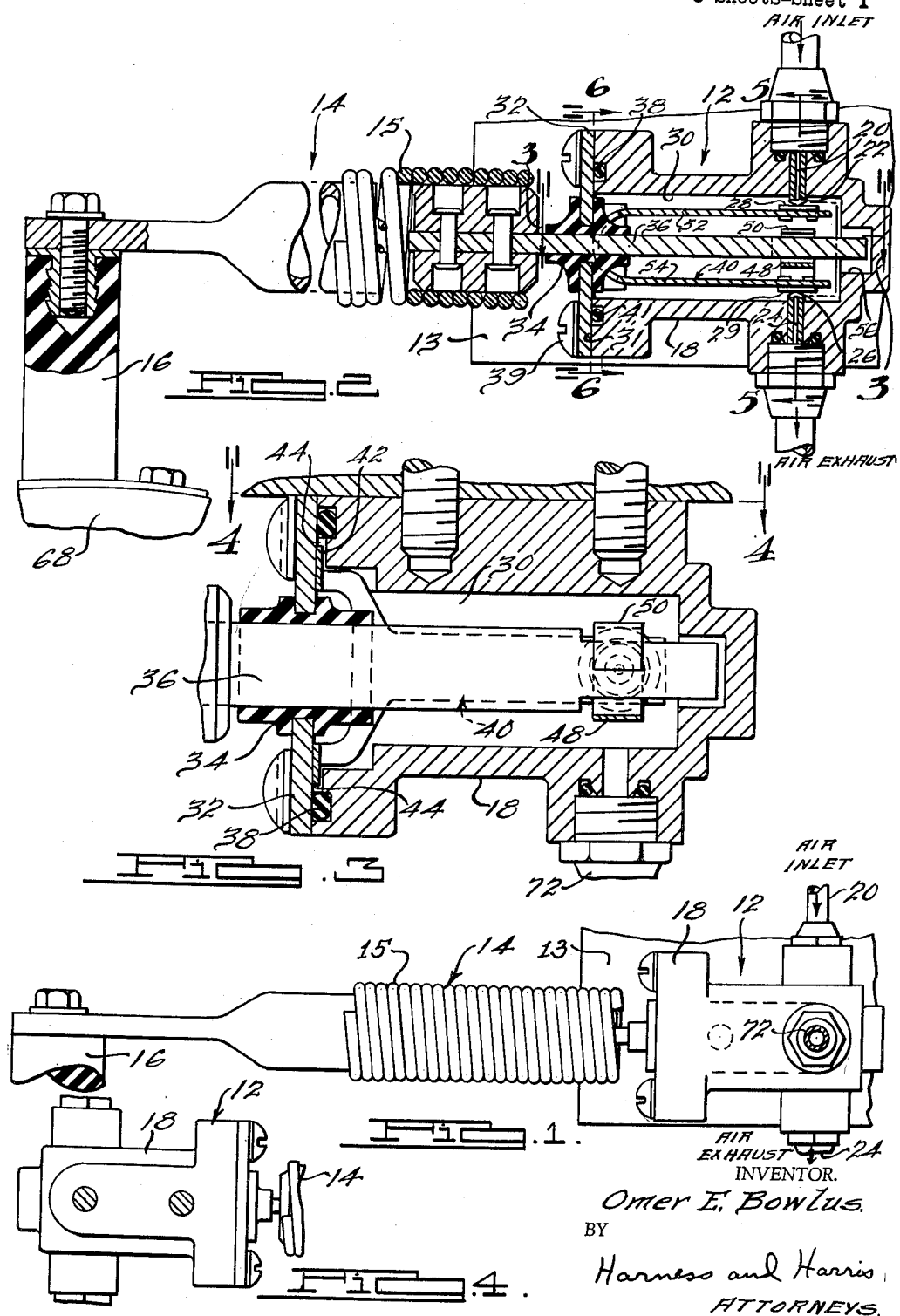

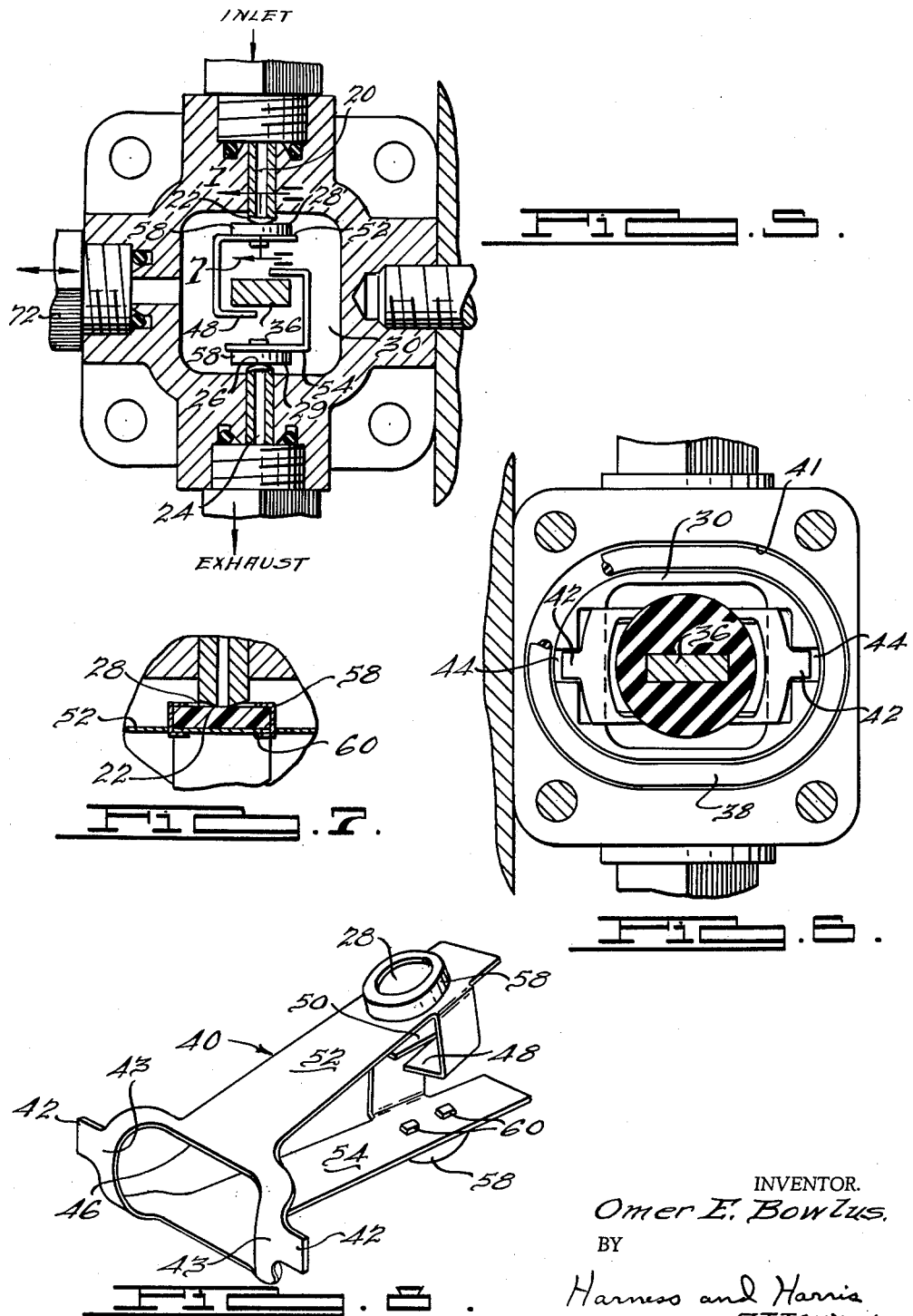

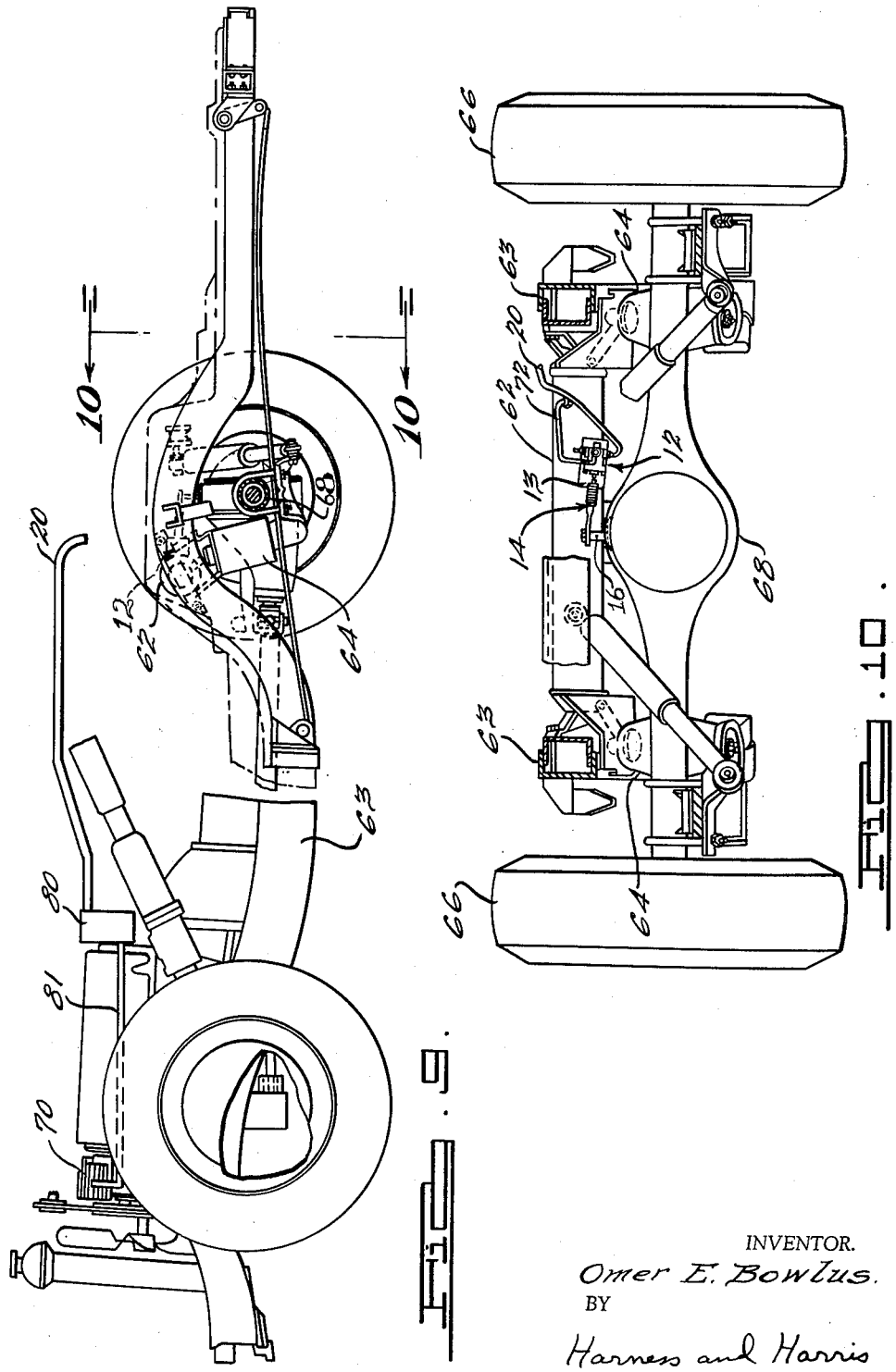

3,018,798
LEVELING VALVE
Omer E. Bowlus, Detroit, Mich., assignor to Chrysler Corporation, Highland Park, Mich., a corporation of Delaware
Filed Nov. 28, 1958, Ser. No. 776,997
11 Claims. (Cl. 137—627.5)

This invention relates to a flow control valve for use in fluid actuated systems and in particular in air suspension systems for automobiles and other vehicles.

In air suspension systems of the type shown for example in copending patent application Serial No. 682,737 filed September 9, 1957, now Patent No. 2,945,702, when used on vehicles to prevent the body thereof from riding too close to the ground or from riding at an angle to one side, the air bags of the air suspension system must be adjusted pressure-wise whenever sustained movement of the body relative to the axles occurs such as results from loading passengers or other weight therein. This pressure adjustment may occur several thousand times during the life of an automotive vehicle and the flow control valve which regulates the speed, duration, and extent of the pressure adjustment must not lose its effectiveness and sensitivity through wear.

Heretofore fluid flow control or leveling valves of a greater complexity than the herein disclosed valve have been employed but have frequently not been able to endure a life cycle test without losing their effectiveness and sensitivity due to failure of certain of their relatively large number of moving parts which are naturally susceptible to wear.

It is, therefore, a major object of this invention to provide an extremely simple and novel fluid flow control or leveling valve having a minimum number of moving parts which move very small distances, and which have a minimum susceptibility to wear through friction and/or corrosion.

A specific object is to provide a novel bearing and sealing means for mounting the actuating element of a leveling valve to allow said valve to be hermetically sealed.

A further specific object is to provide a floating mounting for the porting face supporting spring to allow the flexing forces thereon to be transmitted substantially throughout said spring.

Further objects and advantages will become apparent from the following description and drawings, in which:

FIG. 1 represents a top elevational view of a leveling valve embodying this invention;

FIG. 2 represents a longitudinal cross sectional view of the valve of FIG. 1 taken transversely to the plane of view of FIG. 1;

FIG. 3 represents a cross sectional view of the valve in FIG. 2 taken along the line 3—3 of FIG. 2 in the direction of the arrows;

FIG. 4 represents an elevational view of the valve taken along the line 4—4 of FIG. 3 in the direction of the arrows;

FIG. 5 represents a cross sectional view taken along the line 5—5 of FIG. 2 in the direction of the arrows;

FIG. 6 represents a cross sectional view of the valve of FIG. 2 taken along the line 6—6 in the direction of the arrows;

FIG. 7 represents a view taken along the line 7—7 of FIG. 5 in the direction of the arrows;

FIG. 8 is an isometric view of the valve face supporting spring;

FIG. 9 represents a side view of an automotive vehicle chassis having an air suspension system with a leveling valve embodying this invention; and FIG. 10 is a sectional view of FIG. 9 taken along the line 10—10 of FIG. 9 in the direction of the arrows.

Referring to the drawings and in particular to FIGS. 1 and 2, a leveling valve generally designated 12 is secured to a base 13 which may be secured to an automotive chassis or to any structure that is immovably secured thereto. A porting means actuator or cantilever 14 has a resilient shock absorbing portion 15 adapted to be connected to a portion of an automotive axle carrier 68 (see FIG. 10) through a linkage member 16 which may be of resilient material to also absorb excessive road shock.

Referring to FIG. 2, valve 12 is provided with a housing or body 18 having a pressure fluid inlet passage or port 20 terminating in an inlet port seat 22 and is also provided with an exhaust passage or port 24 terminating in an exhaust port seat 26, both of which port seats 22 and 26 are tapered as shown by seat 22 in FIG. 7 to provide a good sealing contact with their respective port sealing faces 28 and 29 described below. A cavity or chamber 30 in body 18 has an opening in one end thereof defined by face 31 which opening is hermetically sealed by sealing plate 32, sealing grommet 34, actuating arm 36, and O-ring 38 positioned in groove 41 in face 31. Securing means 39 maintains plate 32 tightly against O-ring 38. Porting means comprising a spring 40 positioned in cavity 30 and having attached thereto port sealing faces 28 and 29 of resilient material preferably polyurethane plastic resiliently urges these faces into contact with seats 22 and 26 respectively to normally close ports 20 and 24 and prevent fluid flow therethrough. Faces 28 and 29 as shown in FIGS. 7 and 8 are secured to spring member 40 by retaining capsules 58 provided with tabs 60 that project through arms 52 and 54 and are bent over on the opposite sides thereof.

Referring to FIGS. 3 and 8, spring 40 is provided with pivoting projections 42 which are loosely retained in recesses 44 in body 18 by sealing plate 32. An actuating arm portion 36 of cantilever 14 extends through aperture 46 in spring 40 and lies intermediate hook-shaped projections 48 and 50 which extend from opposite arm portions 52 and 54 respectively of spring 40. A space is provided between said arm portion 36 and each of said hook portions 48, 50 when said arm portion is dead center and in a non-actuating position as shown in FIG. 2. Selective pivotal movement of the actuator 14 about its pivot 34 will result in pulling a selected one of said faces 28 or 29 away from its associated seat 22 or 26. To prevent excessive bending of spring 40, stop shoulders 56 are provided in housing 18 to abut the free end of actuating arm 36 at the predetermined limit of its travel in either direction.

Referring further to FIGS. 2 and 3, the sealing grommet 34 is either molded in situ onto plate 32 and actuator lever 14 or is secured to said plate and lever by a tight frictional fit. The preferred attachment is by molding in situ. With this type of mounting for lever 14 no extraneous pivot is required, and moving parts for providing such a pivot are eliminated. Grommet 34 also provides hermetic sealing of arm 36, faces 28 and 29, spring 40, and ports 22 and 26 in cavity 30 and minimizes the corrosion of these parts due to moisture, dust and gases.

Referring specifically to FIG. 8, segments 43 of the spring 40 connecting arms 52 and 54 are relatively thin to allow bending of spring 40 to occur in these portions rather than along the arms. This non bending of the arms is desirable to prevent excessive movement of valve faces 28 and 29 transversely with respect to seats 22 and 26 which movement would result in excessive abrasion and wearing of faces 28 and 29. Moreover, the spring mounting tabs 42 are loosely held in recesses 44 in body 18 (see FIGS. 3 and 6) and allow spring 40 to pivot in response to actuation of either of arms 52 and 54 by arm 36 which pivoting motion distributes the flexing of spring 40 substantially symmetrically throughout the entire spring which further minimizes the aforesaid transverse movement of valve faces 28 and 29 with respect to seats 22 and 26.

Referring to FIGS. 9 and 10, leveling valve 12 is mounted on an air chamber or conduit 62 which is secured to chassis 63 of a vehicle and communicates with the pair of spaced air bags or springs 64 located adjacent each wheel 66 and compressed between the chassis and the axle carrier of the vehicle. Actuator 14 and link member 16 operatively connect arm 36 of valve 12 to the axle carrier 68 to transmit motion of axle carrier 68 to said arm. Inlet passage 20 is connected to accumulator 80 which is connected by conduit 81 to an air compressor 70 (see FIG. 9) to receive air under pressure therefrom. Air from inlet passage 20 is supplied to cavity 30, and charging conduit or port 72 connects cavity 30 with the air chamber 62 and air bags 64.

In the operation of leveling valve 12, rapid up and down motion of the valve relative to the axle 68 such as occurs during normal driving over a rough road will cause intake port 20 and exhaust port 24 to be alternately opened and closed millions of times during the normal life of a vehicle without causing a significant pressure change to occur in chamber 62 and bags 64 connected thereto due to the relatively short period of time that the inlet and exhaust ports are open and also due to the restricted flow areas of these ports. However, upon loading the body and frame with weight greater than a predetermined amount, the sustained downward motion of valve 12 will cause actuator 14 to pivot on pivot 34 to cause arm 36 to abut hook 48 and draw face 28 away from inlet seat 22 to allow air to flow into cavity 30 and thence through the air bag charging port 72 to air chamber 62 and air bags 64. This air flow into springs 64 will cause the frame and body to rise above the axle carrier until actuator 14 assumes its non-actuating position shown in FIG. 2 to allow face 28 to close inlet port 22 under the inherent resiliency of spring 40 and prevent additional air from further entering cavity 30 and springs 64. When the load on the vehicle is lightened, the valve 12 will move upwardly with respect to axle carrier 68 and actuator 14 connected thereto and cause member 40 to close inlet port 20 and open exhaust port 24 to reduce the pressure in springs 64 and bring the body down to its original height with respect to the axle carrier 68 at which position the inlet and exhaust ports will both become closed.

It is obvious that separate leveling valves could be provided adjacent each wheel of the vehicle to provide adjustment of the level of the vehicle body with respect to the axle thereof when sustained loading of one side of the body occurs. In such a case the air chamber 62 would be provided with an air tight division at approximately its mid point to provide separate air chambers for each leveling valve.

I claim:

1. A fluid regulating valve comprising a body having a cavity therein, a fluid inlet port and a fluid exhaust port in said body communicating with said cavity, a working outlet in said body communicating with said cavity, porting means in said cavity simultaneously resiliently urged toward each said port to simultaneously restrict the flow area of each said port, said porting means comprising a unitary resilient strip having leg portions disposed adjacent each said port and a spring portion integral with and connecting said leg portions, a porting means actuator extending into said cavity and into juxtaposition to said leg portions and adapted to selectively engage each thereof, and resilient sealing means secured to said actuator and said body to hermetically seal said porting means and said actuator in said cavity and to provide a resilient pivotal mounting for said actuator.

2. A fluid regulating valve comprising a body having a cavity therein, a fluid inlet port and a fluid exhaust port in said body communicating with said cavity, a working outlet in said body communicating with said cavity, porting means in said cavity simultaneously resiliently urged toward each said port to simultaneously restrict the flow area thereof, said porting means comprising a unitary resilient strip having leg portions disposed adjacent each said port and a spring portion integral with and connecting said leg portions, a porting means actuator having one portion extending into said cavity and into juxtaposition to said porting means and having a second portion extending away from said body and adapted to transmit lateral pressure thereon to said porting means to actuate the same, said second portion being resilient to absorb road shock, and resilient sealing means adhesively bonded to said actuator and sealed against said body to hermetically seal said porting means and said one portion of said actuator in said cavity and to provide a resilient pivotal mounting for said actuator.

3. A fluid regulating valve comprising a body having a cavity therein, a fluid inlet port and a fluid exhaust port in said body communicating with said cavity, a working outlet in said body communicating with said cavity, porting means in said cavity simultaneously resiliently urged toward each said port to simultaneously restrict the flow area thereof, said porting means comprising a unitary resilient strip having leg portions disposed adjacent each said port and a spring portion integral with and connecting said leg portions, a porting means actuator extending into said cavity and into juxtaposition to said porting means, and resilient sealing means secured to said actuator and said body to hermetically seal said porting means and said actuator in said cavity and to provide a resilient pivotal mounting for said actuator, said actuator being arranged with respect to said porting means so that pivotal movement thereof in opposite directions causes said porting means to selectively open one or the other of said ports.

4. A fluid regulating valve comprising a body having an open ended cavity therein, a fluid inlet port and a fluid exhaust port in said body communicating with said cavity, a working outlet in said body communicating with said cavity, porting means in said cavity simultaneously resiliently urged toward each said port to simultaneously restrict the flow area thereof, said porting means comprising a unitary resilient strip having leg portions disposed adjacent each said port and a spring portion integral with and connecting said leg portions, a porting means actuator extending into said cavity and into juxtaposition to said porting means, and resilient sealing means secured to said actuator and said body adjacent the open end of said cavity to hermetically seal said porting means and said actuator in said cavity and to provide a resilient pivotal mounting for said actuator.

5. A fluid regulating valve comprising a body having an open ended cavity therein, a fluid inlet port and a fluid exhaust port in said body communicating with said cavity, a working outlet in said body communicating with said cavity, porting means in said cavity simultaneously resiliently urged toward each said port to simultaneously restrict the flow area thereof, said porting means comprising a unitary resilient strip having leg portions disposed adjacent each said port and a spring portion integral with and connecting said leg portions, a porting means actuator having a portion thereof extending into said cavity and into juxtaposition to said porting means, said actuator being pivotally mounted on said body adjacent the open end of said cavity therein by resilient sealing means hermetically secured to said actuator and said body to hermetically seal said porting means and said actuator portion in said cavity, said actuator portion being arranged with respect to said porting means so that pivotal movement of said actuator in opposite directions causes said porting means to selectively open one or the other of said ports.

6. A fluid regulating valve comprising a body having a cavity therein, a fluid inlet port and a fluid exhaust port in said body communicating with opposite portions of said cavity, each said port terminating in a porting seat in said opposite portions, a working outlet in said body communicating with said cavity, and porting means in said cavity having portions thereof adjacent each said port and adapted to selectively open and close the same, said portions comprising a pair of resiliently connected arms each carrying a port sealing face and urging the same respectively toward one each of said seats, a porting means actuator pivotally mounted in said cavity by a resilient sealing grommet, said grommet being hermetically secured to said actuator and to said body, and said actuator being adapted upon pivotal movement to selectively engage said arms to selectively move said faces from said seats.

7. A fluid regulating valve comprising a body having a cavity therein, a fluid inlet port and a fluid exhaust port in said body communicating with said cavity, each said port terminating in a seat on opposite sides of said cavity, a working outlet in said body communicating with said cavity, porting means in said cavity comprising a pair of supporting arms connected by relatively thin resilient connecting segments being pivotally mounted in said body, and a port sealing face secured on each of said supporting arms, said connecting segments resiliently urging each of said arms and valve faces toward one each of said ports to restrict the flow area thereof, an actuating portion on each of said supporting arms, and a porting means actuator in said cavity adapted to selectively engage said actuating portions of said arms to move the valve face associated therewith away from its associated seat, said actuator comprising a cantilever member pivotally mounted in sealing means secured to said body and hermetically sealing said porting means and said actuator in said cavity.

8. A fluid regulating valve comprising a body having a cavity therein, a fluid inlet port and a fluid exhaust port in said body communicating with said cavity, each said port terminating in a seat on opposite sides of said cavity, a working outlet in said body communicating with said cavity, porting means in said cavity comprising a pair of supporting arms connected by relatively thin resilient connecting segments being pivotally mounted in said body, and a port sealing face secured on each of said supporting arms, said connecting segments resiliently urging each of said arms and valve faces toward one each of said ports to restrict the flow area thereof, an actuating portion on each of said supporting arms, and a porting means actuator in said cavity adapted to selectively engage said actuating portions of said arms to move the valve face associated therewith away from its associated seat, said actuator comprising a cantilever member pivotally mounted in sealing means secured to said body and hermetically sealing said porting means and said actuator in said cavity, said sealing means comprising a sealing plate having a resilient sealing grommet hermetically sealed in an aperture therein, and to said cantilever member.

9. A leveling valve comprising a body having a cavity therein, a fluid inlet port and a fluid exhaust port in said body communicating with said cavity, each said port being defined by a seat on opposite sides of said cavity, a working outlet in said body communicating with said cavity, and porting means adjacent each said port and adapted to selectively individually and simultaneously close the same, said porting means comprising a pair of resiliently connected arms each having a port sealing face thereon urged respectively toward one each of said seats, each of said arms further having a hook-shaped projection extending toward the other of each of said arms a distance more than one half the distance between said arms to provide a lever space, and a lever extending into said space to selectively engage each of said projections to move the porting face associated therewith from its associated seat.

10. A leveling valve comprising a body having a cavity therein, a fluid inlet port and a fluid exhaust port in said body communicating with said cavity, each said port being defined by a seat on opposite sides of said cavity, a working outlet in said body communicating with said cavity, and porting means adjacent each said port and adapted to selectively individually and simultaneously close the same, said porting means comprising a pair of resiliently connected arms each having a port sealing face thereon urged respectively toward one each of said seats, each of said arms further having a hook-shaped projection extending toward the other of each of said arms a distance more than one half the distance between said arms to provide a lever space, and a lever pivotally mounted in said cavity and sealed therein by a resilient sealing grommet and extending into said space to selectively engage each of said projections upon being pivoted to move the porting face associated therewith from its associated seat.

11. A leveling valve comprising a body having a cavity therein, a fluid inlet port and a fluid exhaust port in said body communicating with said cavity, each said port being defined by a seat on opposite sides of said cavity, a working outlet in said body communicating with said cavity, and porting means adjacent each said port and adapted to selectively individually and simultaneously close the same, said porting means comprising a pair of resiliently connected arms each having a port sealing face thereon urged respectively toward one each of said seats, each of said arms further having a hook-shaped projection extending toward the other of each of said arms a distance more than one half the distance between said arms to provide a lever space, and a lever pivotally mounted in said cavity and sealed therein by a resilient sealing grommet, said lever having a resilient portion extending from said body to receive pivoting forces, and said lever having another portion extending into said space to selectively engage each of said projections upon being pivoted in response to said forces to move the porting face associated with each said projection from its associated seat.

References Cited in the file of this patent

UNITED STATES PATENTS

| | | |
|---|---|---|
| 2,171,149 | Schroter | Aug. 29, 1937 |
| 2,667,897 | Huntington | Feb. 2, 1954 |
| 2,844,384 | Jackson | July 22, 1958 |

FOREIGN PATENTS

| | | |
|---|---|---|
| 616,280 | Great Britain | Jan. 19, 1949 |
| 941,937 | France | Jan. 25, 1949 |
| 967,768 | France | Apr. 5, 1950 |
| 782,951 | Great Britain | Sept. 18, 1957 |